UNITED STATES PATENT OFFICE.

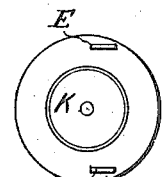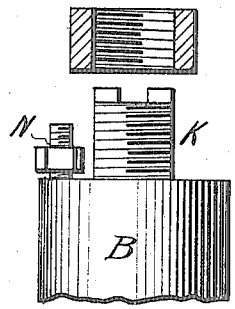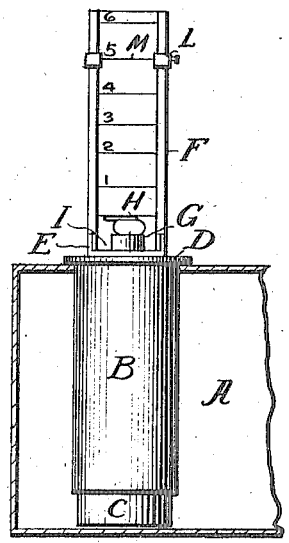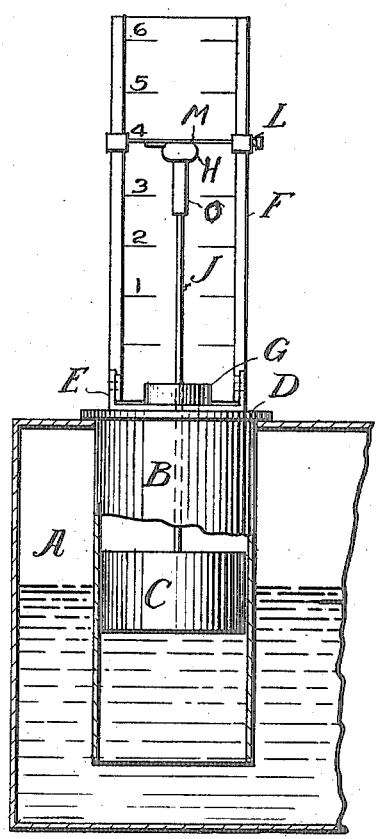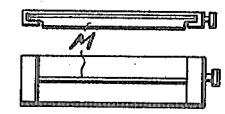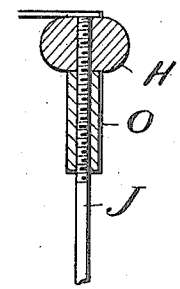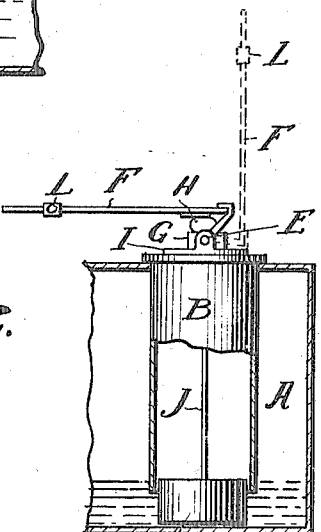

DAVID M. MARTIN, OF CHATHAM, ONTARIO, CANADA.

LIQUID-LEVEL INDICATOR.

1,263,451.   Specification of Letters Patent.   Patented Apr. 23, 1918.

Application filed January 2, 1917. Serial No. 140,313.

*To all whom it may concern:*

Be it known that I, DAVID M. MARTIN, of the city of Chatham, in the county of Kent, in the Province of Ontario, Canada, have invented certain new and useful improvements in liquid-level indicators to tally the measurements of gasolene in tanks of automobiles and other motor-vehicles using gasolene, and do hereby declare the following to be a full, clear, and exact description of the same.

My invention relates to improvements in indicators for measuring gasolene in tanks of automobiles and other motor vehicles in which a float rises and lowers automatically within a tube as the tank or other receptacle is filled or emptied, the float being connected with an indicator which points to figures marked on a collapsible tally plate.

The objects of my improvements are first, to have an indicator that can be placed out of the way horizontally, and when wanted can be instantly raised to a vertical position to tally the exact amount of gasolene in the tank of automobiles or other motor propelled vehicles that use gasolene, 2nd to detect leakages in said tanks or other accessories in connection; third to ascertain the amount of gasolene used in traveling, and fourth to detect improper measurements.

I attain these objects by the mechanism illustrated in the accompanying drawings, in which Figure 1 is a view of an empty tank, a tube suspended therein, a float resting on the bottom thereof, an indicator and front view of the tally plate when in a vertical position.

Fig. 2 is a view of the tank with some gasolene therein, a tube suspended from the top of tank, and partly cut away to show a float held down to the bottom of tank by a tally plate turned down in a horizontal position.

Fig. 3, is another view of the tank partly filled with gasolene, a tube suspended from the top thereof partly cut away showing the instrument in operation, the float having risen as the liquid was poured into the tank until the indicator finger points to the figure 4 of the tally plate after it is raised to a vertical position.

Fig. 4, is a view of the nipple at top end of tube.

Fig. 5, is the lock-nut that draws and holds the tube against the top of tank.

Fig. 6, is a top view of base of tally plate and nipple.

Fig. 7, is a magnified view of the indicator head and spindle.

Referring to Figs. 1 and 2, "A" is the tank of an automobile in which is hung the tube "B". This is put in place by inserting the nipple "K" through a hole prepared for the same in top of tank, the gasket "D" and the base "I" and fastened in position by the lock-nut "G". The tally plate "F" is attached to the plate "I" by means of knuckle joint "E". This joint is placed to one side of the center line of the end of tube "B", so that when the tally plate is placed in a horizontal position it will cover the indicator head "H" and lie close to the seat. The float "C" within the tube is connected with the indicator head "H" by a spindle "J" threaded at the upper end for adjustment as may be required. A magnified view of the spindle is shown in Fig. 7.

The special purpose for which this improvement was devised, was to know at any time the condition of gasolene in automobile tanks.

For instance:—The tank is filled with gasolene, the quantity ascertained with the indicator, the tally plate placed in a horizontal position and covered: the machine is left standing a couple of hours, and for some reason there arises a suspicion that a loss of gasolene has occurred. This instrument is again brought into operation by removing the seat and raising the tally plate to a vertical position, when instantly, the indicator rises to a point showing that less fluid is in the tank than when it was filled, so the machine is examined and it may be found that the carbureter is out of order. Leakages from other sources can also be detected. It can be known when traveling how much gasolene is used per mile, as shown by the speedometer. The correct amount of gasolene bought can be detected, and at any time the quantity of liquid in the tank can be ascertained.

In operation, the float "C" is held to the bottom of tank "A" by the tally plate "F" as shown in Fig. 2. To ascertain the quantity of liquid in the tank, the tally plate "F" is released and placed in a vertical position as shown by the dotted lines which allows the liquid to raise the float "C" as shown in Fig. 3. To prevent leakages through the instrument the gasket "D" is placed between the top of tank and base "I" of the tally plate and the lock-nut "G" drawn up tight. Also the shank O of the indicator head "H" when down fits closely in the hole at the top of nipple "K", and as soon as the tally plate T is raised and the shank O released from the opening the indicator moves up and down quite freely.

It is to be noted that the float "C" being flat below and within the tube "B" is not affected by any agitation of the liquid outside when the tank is being filled, but that all pressure of liquid to bear on it comes from below, and causes it to rise steadily on the tally plate "F". I have a slide marker "M", which is placed to the last tally indicated and set by a fastener "L". A side and end view of the marker is more fully shown in Fig. 8. The purpose of the small nipple "N" is to hold the tube "B" to the top of tank and facilitate the drawing up of the tube by the lock-nut "G". The tally plate "F" has its edges turned inward for the insertion of a card or other material on which the guide marks are placed and covered with a transparent substance. As different makes of automobiles have different sized tanks, the tally plate has to be made or adjusted to suit the tanks.

As floats have been used for measuring liquids for various purposes, I do not make my claims broadly:

What I do claim as my invention and desire to secure by Letters Patent is:

1. In combination with a tube adapted to be suspended in a liquid receptacle and immersed in the liquid and to admit the latter to the lower end of said tube, a float within said tube, indicating means above said tube carried by said float, and a graduated plate arranged to coöperate with said indicating means when said plate is in upright position, but jointed to fold at will over the top of said indicating means, holding down the same and said float when these parts are in their lowest positions.

2. In combination with a tube immersed in liquid and open at the bottom, a float within said tube, a rod mounted on said float, an indicator carried by said rod and a tally plate arranged to coöperate with said indicator when said plate is in raised position, but jointed to fold at will over the top of said rod, when said float is in its lowest position.

3. A tube having an upwardly extending tubular screw-threaded part and an open lower end, in combination with a gasket of greater diameter than said tube and a nut engaging said screw-threaded part to hold said gasket and tube together, a float in said tube, a rod extending from said float up through said tubular part, an indicator carried by said rod, a graduated plate mounted on said gasket and coöperating with said indicator, and a tank containing liquid in which said tube is immersed, the top of said tank being overlapped by the peripheral part of said gasket, so that the latter answers the two purposes of suspending the tube and supporting the graduated plate.

4. A tube and a tank, in combination with means for suspending the former in the latter, a rod carrying an indicator head which moves up and down in said tube, a float carrying said rod, a graduated plate, a marker attached to said plate but movable upward and downward thereon, means for clamping said marker at any desired point of graduation, the said plate folding at will into a horizontal position and depressing said marker.

5. A tube and a tank, in combination with means for suspending the former in the latter, a float working in said tube, a rod mounted on said float and carrying an indicator head which moves up and down with said float, a graduated plate above said tube, a marker attached to said plate but movable upward and downward thereon, and means for clamping said marker at any desired point of graduation.

DAVID M. MARTIN.

Copies of this patent may be obtained for five cents each, by addressing the "Commissioner of Patents, Washington, D. C."